3,188,319
PRODUCTION OF VINYL ESTERS
Jürgen Smidt, Munich-Solln, and Alex Sabel, Munich-Grosshadern, Germany, assignors to Consortium fur Elektrochemische Industrie G.m.b.H., Munich, Germany
No Drawing. Filed Oct. 25, 1961, Ser. No. 147,466
Claims priority, application Germany, Oct. 28, 1960, C 22,631
7 Claims. (Cl. 260—326)

The present invention relates to an improved process for the production of vinyl esters and more particularly to a process for the transesterification of lower vinyl esters with higher molecular weight carboxylic acids in the presence of a catalyst.

It is known that the difficult to obtain carboxylic acid vinyl esters can be produced by the transesterification of vinyl acetate with the corresponding carboxylic acid in the presence of Hg salts and strong acids. This process is technically advantageous for the production of higher fatty acid esters and esters of other carboxylic acids which, because of their low volatility, do not lend themselves to a vapor phase reaction with acetylene.

In the reaction of vinyl acetate with carboxylic acids in the presence of Hg salts and strong acids, reactions other than the desired transesterification can occur. Already at temperatures as low as 60° C. the carboxylic acid begins to add on to the double bond of the vinyl acetate with the production of ethylidene diesters. This undesired side reaction reduces the yield of the desired vinyl ester considerably at reaction temperatures which are practical to use. At lower temperatures the time required for the reaction is too long for practical purposes.

In addition, the Hg containing catalyst used leads to products contaminated with Hg which is difficult to separate off completely. As mercury and mercury compounds are detrimental to health, polymers of the vinyl esters thus produced cannot be used as packaging materials for foods nor in paints for rooms in residences. In addition, the presence of mercury or mercury compounds considerably decreases the ease with which the vinyl esters can be polymerized. It has already been proposed that the mercury impurities be removed as sulfides by a sulfide wash. However, this causes the introduction of new undesired impurities.

It furthermore is known that vinyl esters can be produced from carboxylic acids and acetylene in the liquid phase at pressures of 20–25 atmospheres using zinc or cadmium catalysts. However, the high pressure apparatus required is rather costly and the vinyl esters produced also contain impurities which hinder their polymerization. Vinyl esters of dibasic acids are difficult to produce by such process.

According to the invention it was found that vinyl esters of higher carboxylic acids can be produced by transesterification of the easily available vinyl esters of carboxylic acids containing 1–4 carbon atoms in a water free medium in the presence of platinum metal salts. Vinyl acetate is especially suited as a starting material. The production of by-products, such as the ethylidene diesters, is entirely avoided by the process of the invention and very pure vinyl esters are obtained as products.

Expediently the reaction is carried out at the reflux temperature of the vinyl ester, such as vinyl acetate, employed as a starting material usually in excess. However, a temperature within the range of 25–180° C. can be used. In some instances the use of a slightly raised pressure may be expedient.

Salts of metals of the platinum group and especially palladium salts are used as the catalysts in the process according to the invention. Double chlorides, such as $PdCl_2.LiCl$, which are soluble in the water free reaction medium are especially suited. The quantity of platinum metal salts used expediently is 0.0005–0.1 mol and, preferably, 0.001–0.05 mol, per mol of carboxylic acid supplied. The salts are either dissolved directly in the reaction medium or they can be supported on carriers. As carriers it is preferable to use materials having a large surface area as is customary for catalytic processes carried out with supported catalysts. Active carbon is especially suited. With supported catalysts it is possible to remove the solid catalyst after completion of the reaction simply by filtration. Thereafter, the vinyl ester produced can be recovered in the usual manner by fractional distillation while the catalyst which has been separated off can be used for the next batch. The process can easily be carried out continuously when supported catalysts are employed.

Saturated and unsaturated aliphatic and aromatic mono-, di- and polycarboxylic acids, such as propionic acid, chloropropionic acid, lauric acid, stearic acid, crotonic acid, oleic acid, linoleic acid, adipic acid, sebacic acid, benzoic acid and the like are suited in the process according to the invention as the higher carboxylic acids for the production of the desired vinyl esters.

The following examples will serve to illustrate the process according to the invention with reference to a number of specific embodiments:

Example 1

108.5 g. of α-chloropropionic acid and 258.0 g. of vinyl acetate were boiled under reflux for 2 hours with 1.17 g. $PdCl_2.LiCl$ and then shaken at room temperature with 10 g. of active carbon and filtered. After neutralization with aqueous sodium carbonate the organic phase was fractionally distilled. 88 g. of α-chloropropionic acid vinyl ester ($n_D^{21}=1.4356$) distilled over at 33° C. and 10 mm. Hg pressure. 33.6 g. of unconverted α-chloropropionic acid were recovered from the neutralized aqueous phase upon acidification and extraction with ether. The yield of vinyl ester was 95% based upon the α-chloropropionic acid converted.

Example 2

100 g. of stearic acid and 186 g. of vinyl acetate were boiled under reflux for 3½ hours with 1.15 g. $PdCl_2.LiCl$ and then shaken with 30 g. of active carbon for 2 hours at 30–35° C., then filtered and fractionally distilled. 75.8 g. of reaction product distilled over at 195–204° C. and 5 mm. Hg pressure, mostly at 203° C. 22.1 g. of unconverted stearic acid remained in the residue. The yield of stearic acid vinyl ester was 90%.

Example 3

73.0 g. of adipic acid and 196 g. of vinyl acetate were shaken at 80–90° C. with 1.10 g. of $PdCl_2 \cdot LiCl$ for 2½ hours in a sealed tube. After cooling the reaction mixture was treated for 15 minutes with 15 g. of active carbon, filtered and fractionally distilled. 41.5 g. of divinyl adipate distilled over at 98–106° C. at 2.0–2.5 mm. Hg pressure. Upon repeating the distillation the boiling point of the divinyl adipate was 89–90° C. at 1.5 mm. Hg pressure ($n_D^{20}=1.4541$). The residue was extracted with ether, leaving 11.5 g. of unreacted adipic acid as the undissolved residue. A total of 32.5 g. of monovinyl adipate were recovered from the ether extract by distillation at 120–130° C. at a pressure of 1.5 mm. Hg. Upon repeating the distillation its boiling point at 1.5 mm. Hg was 127° C. and its melting point 38° C. The ester yield was 95%.

Example 4

74.1 g. of propionic acid and 129.0 g. of vinyl acetate were refluxed with 1.1 g. of $PdCl_2 \cdot LiCl$ and 25 g. of active carbon for 3 hours. After cooling the mixture was filtered and the carbon washed with vinyl acetate. The filtrate was fractionally distilled. 44.9 g. of vinyl propionate were obtained and 37.8 g. of unreacted propionic acid were also recovered from the distillation residue. The yield was 92%.

The activated carbon which had been filtered off was mixed with a further 74.1 g. of propionic acid and 129.0 g. of vinyl acetate and the mixture refluxed for 5 hours without addition of further catalyst. Upon processing the reaction mixture, 38.0 g. of vinyl propionate and 45 g. of propionic acid were recovered, corresponding to a 97% yield. In the 13th repetition using the same catalytic active carbon but without further addition of PdCl₂·LiCl, 36.9 g. of vinyl propionate and 45.7 g. of propionic acid were recovered, corresponding to a 97% yield.

*Example 5*

7.4 g. of propionic acid, 25.8 g. vinyl acetate and 0.215 g. PtCl₄·2LiCl were boiled together under reflux for 5 hours. Upon processing the reaction mixture, 3.8 g. of vinyl propionate and 4.5 g. propionic acid were recovered, corresponding to a 97% yield.

*Example 6*

0.74 g. of propionic acid and 2.58 g. of vinyl acetate were refluxed with 0.025 g. of RhCl₃·LiCl for 7 hours. Upon processing the reaction mixture, 0.34 g. of vinyl propionate and 0.41 g. of propionic acid were recovered, corresponding to a 75% yield.

*Example 7*

20.0 g. of lauric acid and 30 g. of vinyl propionate were refluxed with 0.11 g. of PdCl₂·LiCl and 2.0 g. of active carbon for 3 hours. After filtering, 9.8 g. of vinyl laurate and 11.1 g. of lauric acid were recovered by fractional distillation of the filtrate. The yield was 97%.

*Example 8*

86.1 g. of crotonic acid and 258.0 g. of vinyl acetate were refluxed with 1.91 g. PdCl₂·NaCl and 25 g. of active carbon for 5 hours. Upon processing the reaction mixture, 61.2 g. of vinyl crotonate and 33.6 g. of crotonic acid were recovered, corresponding to a 90% yield.

*Example 9*

66.0 g. of benzoic acid and 129 g. of vinyl acetate were refluxed with 1.46 g. PdCl₂·NaCl and 25 g. of active carbon for 5 hours. Upon processing of the reaction mixture, 42.6 g. of vinyl benzoate and 30.3 g. of benzoic acid were recovered, corresponding to a 98% yield.

*Example 10*

Freshly precipitated palladium hydroxide was dissolved in glacial acetic acid while heating moderately and about ¼ volume of acetic acid anhydride added thereto and the reaction mixture evaporated to dryness under vacuum. 2.1 g. of the thus prepared palladium acetate, 100.0 g. of lauric acid, 129.0 g. of vinyl acetate and 20 g. of active carbon were refluxed together for 5 hours. 63 g. of vinyl laurate were produced and 42.1 g. of unreacted lauric acid were recovered. The yield was 98% based upon the quantity of lauric acid converted.

*Example 11*

0.15 g. of rhodium acetate prepared analogously to the palladium acetate of Example 10 were dissolved in 10 g. of vinyl acetate and refluxed with 7.7 g. of lauric acid and 2.0 g. of active carbon for 5 hours. 2.4 g. of vinyl laurate and 5.6 g. of lauric acid were recovered from the reaction mixture, corresponding to a 97% yield based upon the lauric acid converted.

*Example 12*

35.0 g. of lauric acid, 90.4 g. of vinyl acetate and 0.58 g. of PdCl₂·NaCl were stirred together for 8 hours at 25° C. After separating off the catalyst by filtration with 10 g. of active carbon, 21.7 g. of vinyl laurate and 14.5 g. of lauric acid were recovered, corresponding to a 96% yield based upon the lauric acid converted.

*Example 13*

500 g. of sorbic acid and 1,150 g. of vinyl acetate were refluxed with 10.5 g. of PdCl₂·NaCl for 4 hours. After cooling down the unconverted sorbic acid was filtered off and the filtrate shaken with 30 g. of active carbon filtered again and then fractionally distilled. 195 g. of vinyl sorbate distilled over at 80° C. under a water jet vacuum. Upon repeating the distillation the boiling point of the ester was 53–54° C. at 1 mm. Hg. The refractive index of the pure ester was $n_D^{20}=1.5145$. 265 g. of non-reacted sorbic acid were recovered. The yield of vinyl sorbate was 92% based upon the sorbic acid converted.

*Example 14*

40.0 g. of ε-phthalimido caproic acid and 86.0 g. of vinyl acetate were refluxed with 0.3 g. of PdCl₂·NaCl for 4 hours. The reaction mixture was shaken with 2.5 g. of active carbon after cooling down in order to separate off the catalyst. The catalyst carbon was then filtered off. The vinyl acetate and the acetic acid were separated off under vacuum, the residue taken up by ether and then shaken out with an aqueous solution of sodium bicarbonate. 22.6 g. of vinyl ester of the ε-phthalimido caproic acid were recovered from the ethereal solution. After recrystallization of the ester from the ether the melting point of the former was 51° C. 19.4 g. of non-reacted ε-phthalimido caproic acid were recovered from the sodium bicarbonate solution. The yield of ester was 98%.

In these examples only double chlorides and acetates of metals of the platinum group were used for reasons such as ease of preparation and low cost. It must be pointed out, however, that other salts, e.g., fluorides, bromides, iodides and salts from other carboxylic acids may be used as well. The only restriction in the choice of suitable salts is the condition of at least moderate solubility in the reaction mixture at the particular reaction temperature.

Addition of active carbon or use of a carrier supported catalyst is mainly a convenient way of removing the catalytically active salts by absorption from the cooled down mixture after completion of the reaction.

We claim:

1. In a process for transesterifying vinyl esters by transesterifying lower vinyl esters with a higher molecular weight carboxylic acid in a water free medium in the presence of a catalyst, the step of carrying out such transesterification in the presence of a salt of a metal of the platinum group selected from the group consisting of halides and lower alkyl carboxylic acid salts of metals of the platinum group as the catalyst.

2. The process of claim 1 in which the lower vinyl ester is the vinyl ester of a carboxylic acid of 1 to 4 carbon atoms.

3. The process of claim 1 in which the salt of a metal of the platinum group is a palladium salt.

4. The process of claim 1 in which the salt of a metal of the platinum group is a double chloride soluble in the water free medium.

5. The process of claim 1 in which 0.001 to 0.05 mol of the salt of the metal of the platinum group per mol of higher molecular weight carboxylic acid is used.

6. The process of claim 1 in which said catalyst is supported on a carrier.

7. The process of claim 1 in which said transesterification is carried out at temperatures between 25 and 180° C.

References Cited by the Examiner

UNITED STATES PATENTS

| | | | |
|---|---|---|---|
| 2,245,131 | 6/41 | Herrmann et al. | 260—491 |
| 2,299,862 | 10/42 | Toussaint et al. | 260—491 |
| 2,949,480 | 8/60 | Buselli et al. | 260—491 |
| 2,965,660 | 12/60 | Heise et al. | 260—476 |
| 2,997,494 | 8/61 | Brown | 260—491 |

OTHER REFERENCES

Morton: The Chemistry of Heterocyclic Compounds; McGraw-Hill Pub. Co., New York, 1946, page VI of preface.

Bergmann: The Chemistry of Acetylene and Related Compounds, p. 80 (1948).

IRVING MARCUS, *Primary Examiner.*

WALTER A. MODANCE, *Examiner.*